(12) United States Patent
Steiner

(10) Patent No.: US 6,510,774 B1
(45) Date of Patent: Jan. 28, 2003

(54) CABLE-SAW MACHINE

(76) Inventor: Andreas Steiner, Mondseeberg 77, A-5310, Tiefengraben (AT)

(*) Notice: Subject to any disclaimer, the term of this patent is extended or adjusted under 35 U.S.C. 154(b) by 0 days.

(21) Appl. No.: 09/857,243

(22) PCT Filed: Dec. 1, 1999

(86) PCT No.: PCT/EP99/09321

§ 371 (c)(1), (2), (4) Date: May 30, 2001

(87) PCT Pub. No.: WO00/32340

PCT Pub. Date: Jun. 8, 2000

(30) Foreign Application Priority Data

Dec. 1, 1998 (DE) ..................................... 298 21 386 U

(51) Int. Cl.$^7$ ................................................. B26D 1/00
(52) U.S. Cl. ..................... 83/200.01; 81/651.1; 81/801; 125/21
(58) Field of Search .......................... 83/200.1, 307.1, 83/307.2, 307.3, 801, 651.1; 125/21

(56) References Cited

U.S. PATENT DOCUMENTS

| 3,599,623 | A | * | 8/1971 | Phy | ........................ 125/11.01 |
| 4,735,188 | A | * | 4/1988 | Kubo | ........................ 125/12 |
| 4,765,307 | A | * | 8/1988 | Kubo | ........................ 125/12 |
| 4,787,363 | A | * | 11/1988 | Kubo | ........................ 125/21 |
| 4,854,296 | A | | 8/1989 | Pittet | |
| 4,893,607 | A | * | 1/1990 | Kubo | ........................ 125/21 |
| 5,052,366 | A | * | 10/1991 | Matsukura | ............... 125/16.01 |
| 5,699,783 | A | * | 12/1997 | Kubo | ......................... 125/21 |

FOREIGN PATENT DOCUMENTS

| CH | 588 913 | | 6/1977 | |
| DE | 35 32 717 | A1 | 3/1987 | |
| DE | 39 40 691 | A1 | 6/1991 | |
| DE | 42 20 454 | A1 | 12/1993 | |
| DE | 42 39 212 | A1 | 5/1994 | |
| DE | 298 05 457 | U1 | 9/1998 | |
| EP | 0529886 | * | 3/1993 | |
| EP | 0 738 194 | B1 | 10/1996 | |
| JP | 61182759 | | 8/1986 | |
| JP | 40243007 | * | 2/1990 | |
| JP | 402124259 | * | 5/1990 | ................ 451/217 |
| JP | 40217004 | * | 7/1990 | |
| JP | 7227833 | | 8/1995 | |
| WO | WO 95/18692 | | 7/1995 | |

* cited by examiner

Primary Examiner—M. Rachuba
(74) Attorney, Agent, or Firm—McGlew and Tuttle, P.C.

(57) ABSTRACT

The present invention pertains to a cable saw (1) with a frame (2), a motor drive (7) and a driven cable storage unit (6) for the sawing cable (3) moved in a circulating manner. The drive (7) has a plurality of adjacent drive wheels (11, 12), around which the sawing cable is wound and which together are driven by a motor (8). The motor (8) and optionally an interposed gear (9) are removable by means of a change-over coupling (10). In addition, the cable saw (1) can be broken down into at least three basic components, namely, a main roller head (34), a frame unit (35), and a motor unit (36).

12 Claims, 12 Drawing Sheets

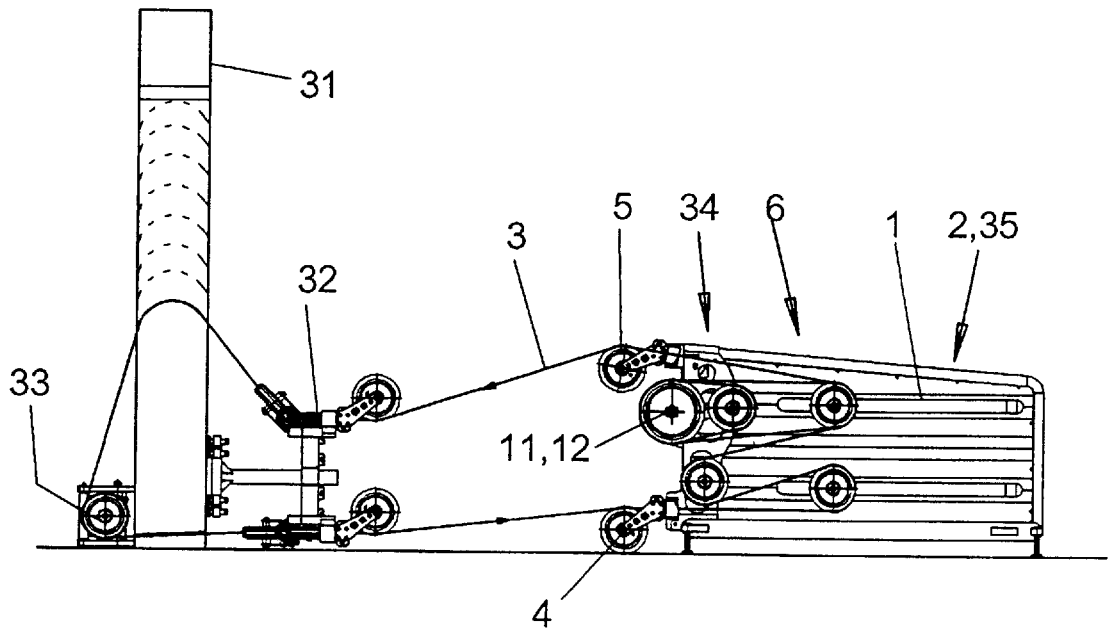
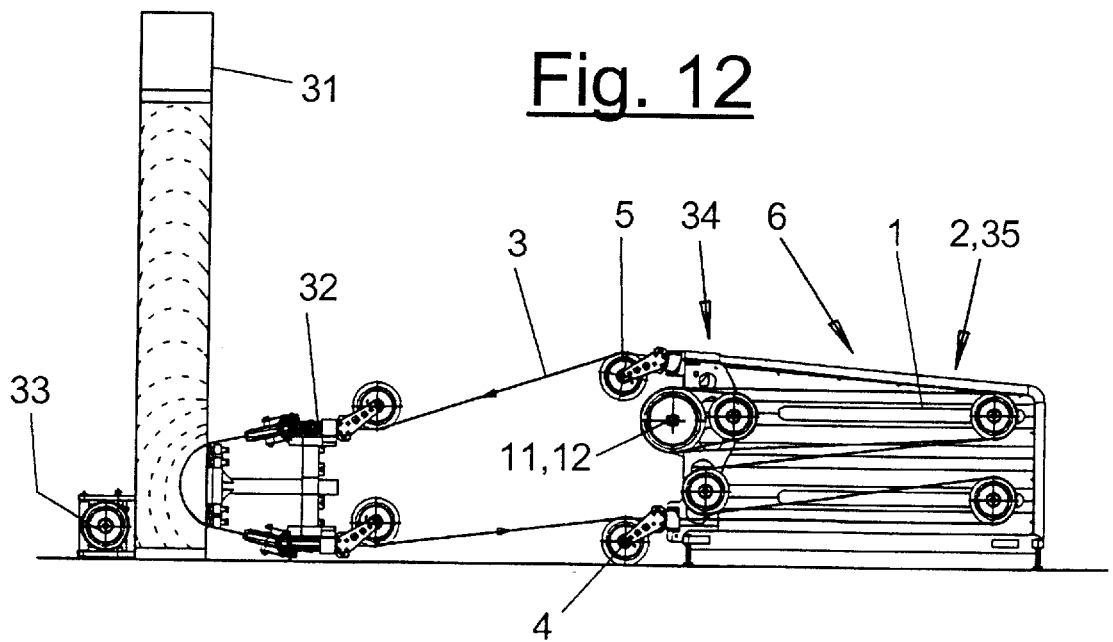

CABLE-SAW MACHINE

FIELD OF THE INVENTION

The present invention pertains to a cable saw with a frame, a motor drive and at least one drive wheel as well as a cable storage unit for a circulatingly driven sawing cable.

BACKGROUND OF THE INVENTION

Such a cable saw has been known from WO 95/18692 or the parallel EP-BI 0 738 194. It comprises a frame, a motor drive and an integrated cable storage unit for an individual endless and circulatingly driven sawing cable. The sawing cable leaving the cable saw is led in a single loop around the workpiece and back again into the cable saw. The drive has a motor and an individual drive wheel, around which the sawing cable is wound. The sawing cable is tensioned by the cable storage unit functioning according to the principle of the pulley block with at least one stationary deflecting roller and a plurality of movable deflecting rollers corresponding to the progressing depth of cut on the workpiece, while the length of cable becoming free is taken up and stored. There may be problems in this arrangement with the reliability of operation and the stability of the cable saw and the sawing cable.

A wire saw, with which a rod-like tool is cut into a plurality of disks in one operation, has been known from JP-A 61 182 759. The finite wire is fed in for this from a wire reserve and clamped in the wire saw on a plurality of deflecting rollers in the form of a triangle. The wire is wound several times over the deflecting rollers, as a result of which a plurality of parallel wire strands, which make it possible to cut off a plurality of disk-shaped workpieces simultaneously, are obtained in the clamping and cutting area. The three deflecting rollers are driven together by a motor and are coupled with one another by means of a toothed belt gear.

SUMMARY AND OBJECTS OF THE INVENTION

The object of the present invention is therefore to provide a better cable saw.

According to the invention, a cable saw is provided with a frame, a motor drive and at least one drive wheel as well as a cable storage unit for a circulatingly driven sawing cable. The drive has a plurality of adjacent drive wheels over which the sawing cable is wound, The adjacent drive wheels are driven together by a motor.

The drive according to the present invention ensures high reliability of operation and stability of the cable saw and the sawing cable. The sawing cable is safely guided on a plurality of drive wheels, and the driving energy is transmitted to the sawing cable essentially without slip and wear. The drive makes do with a single motor, which optionally drives the drive wheels through an interposed transmission at equal speed. This arrangement is particularly economical and reduces the design effort and the space requirement. In addition, the control is simplified.

An especially economical and inexpensive design is obtained if the drive motor is arranged detachably at the cable saw via a suitable change-over coupling. The use of a plug-in quick coupling offers the advantage that rapid replacement and standardization of the interface between different machines are possible. As a result, the motor can be used alone or optionally in connection with the transmission, at different tool machines. The cable saw and other tool machines can thus be designed as inexpensive, driveless skeleton machines, which are then complemented with the motor and optionally the transmission when needed. It is advantageous in this connection for the drive motor to be designed as an electric motor.

The drive according to the present invention also offers special advantages in conjunction with the cable storage unit. This has a plurality of stationary and movable deflecting rollers. The use of double rollers with two grooves has the advantage that greatly different cable arrangements are possible. As a result, the capacity of the storage unit can be varied as desired. The space requirement and the design effort are minimized at the same time. The cable saw is not enlarged despite the great range of variation.

The roller arrangement according to the present invention as well as the special design of the cable inlet and outlet with oblique position and lateral offset offers improved guiding and kinematics for the sawing cable.

The cable saw can be advantageously broken down into at least three basic components, namely, a frame unit, a main roller head, and a motor unit, which may optionally also be designed as a more comprehensive drive unit including the drive wheels. The transport and the handling of the cable saw can be simplified and facilitated by these three or more basic components. Due to the lower weight, the individual components, in particular, can be transported and erected and mounted at the work site more easily. In addition, the space requirement of the cable saw taken apart is reduced.

Additional advantageous embodiments of the present invention are described in the subclaims.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 11 is a side view showing an attachment position of the cable saw;

FIG. 12 is a side view showing an attachment position of the cable saw; and

DESCRIPTION OF THE PREFERRED EMBODIMENT

Figure 1:
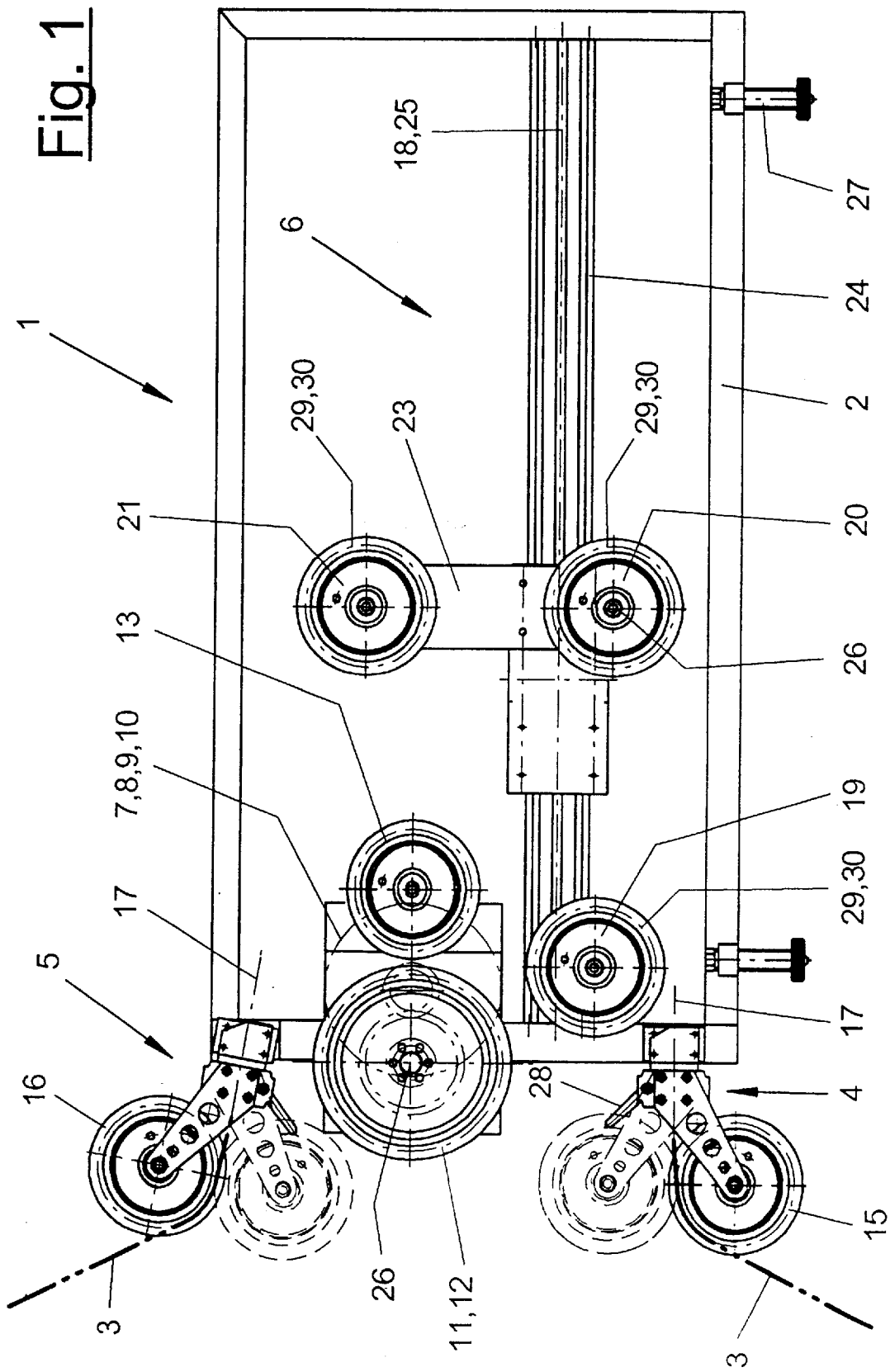
FIG. 1 is a side view of a cable saw.
Figure 2:
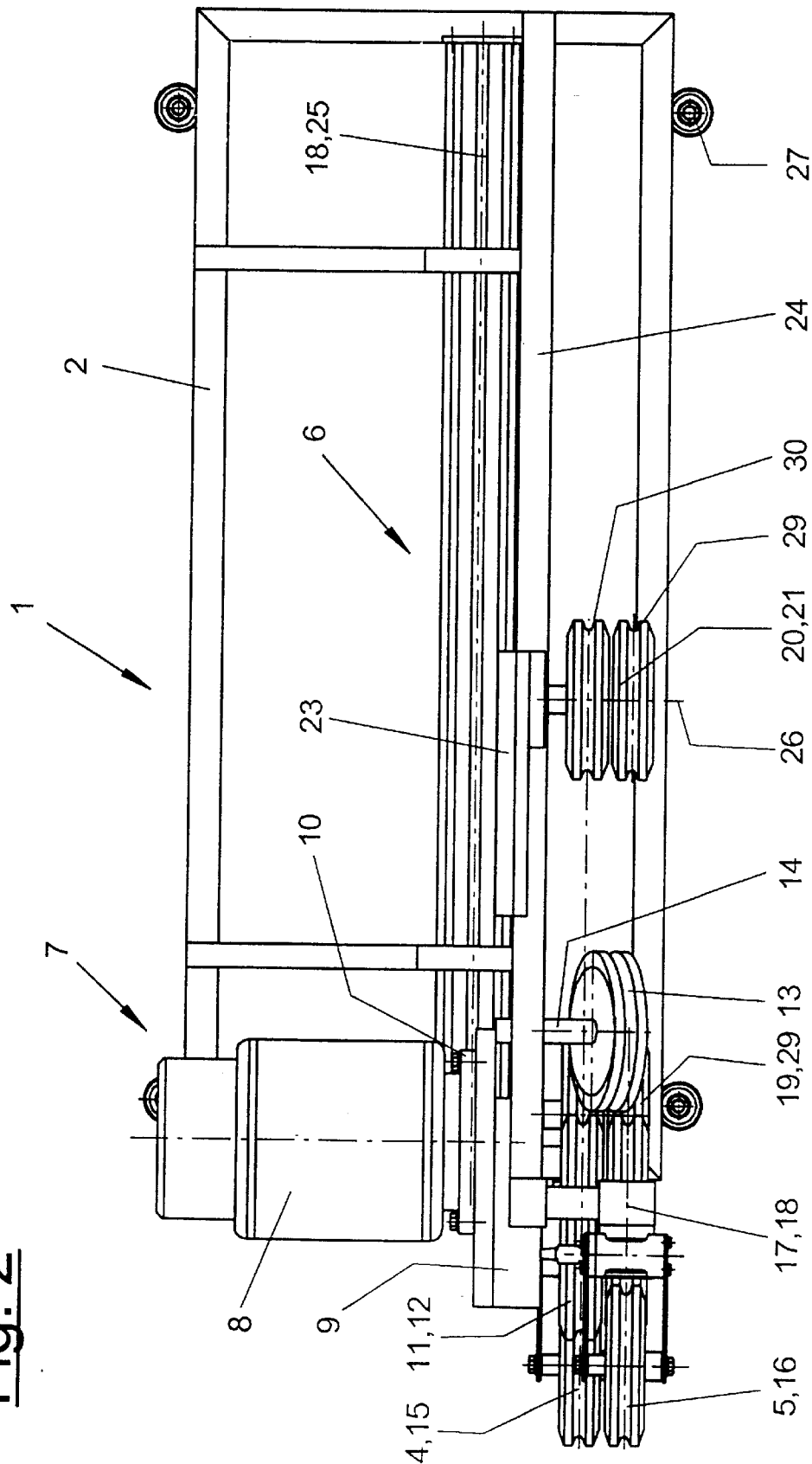
FIG. 2 is a top view of the arrangement according to FIG. 1.
Figure 3:
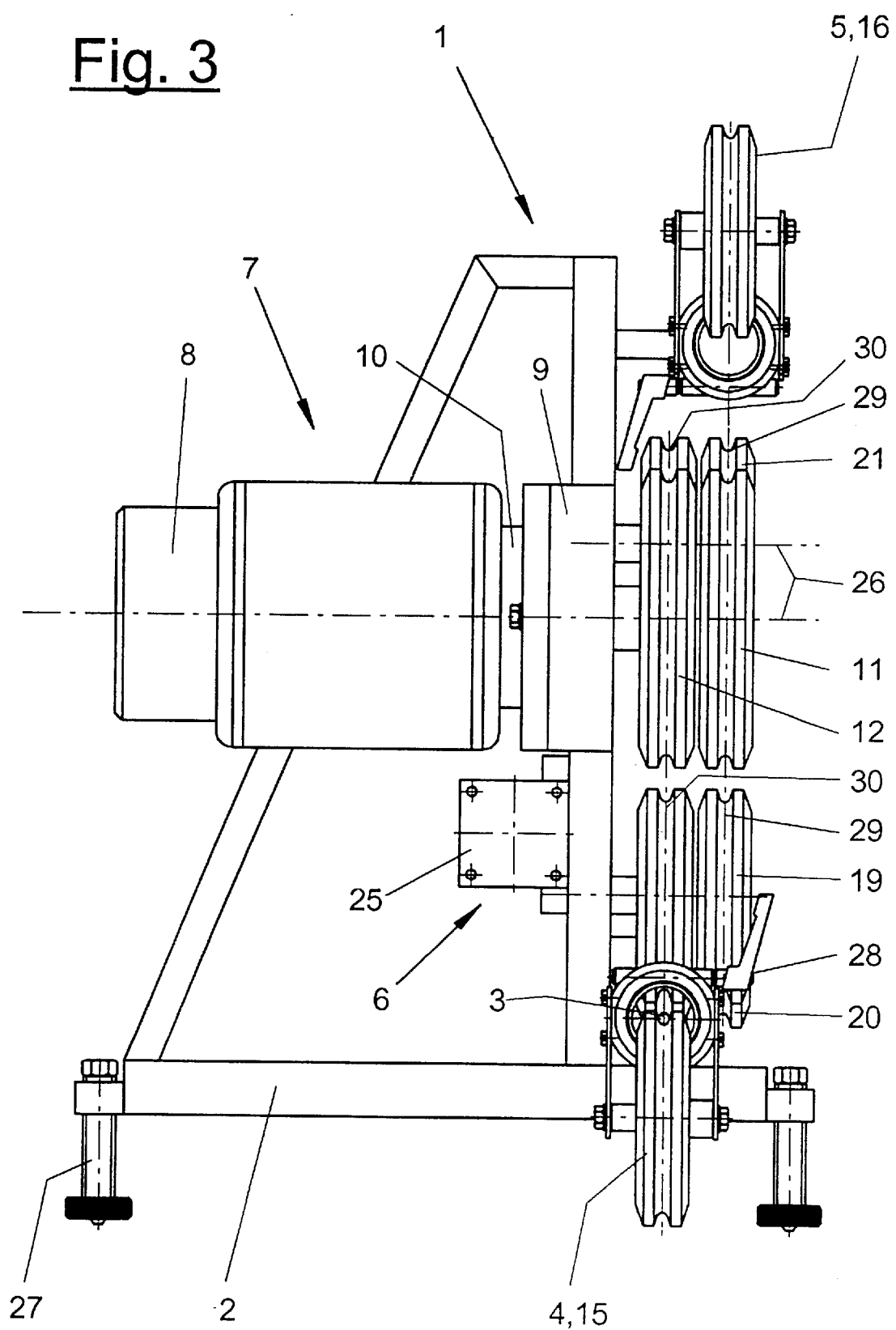
FIG. 3 is a front view of the arrangement according to FIGS. 1 and 2.
Figure 8:
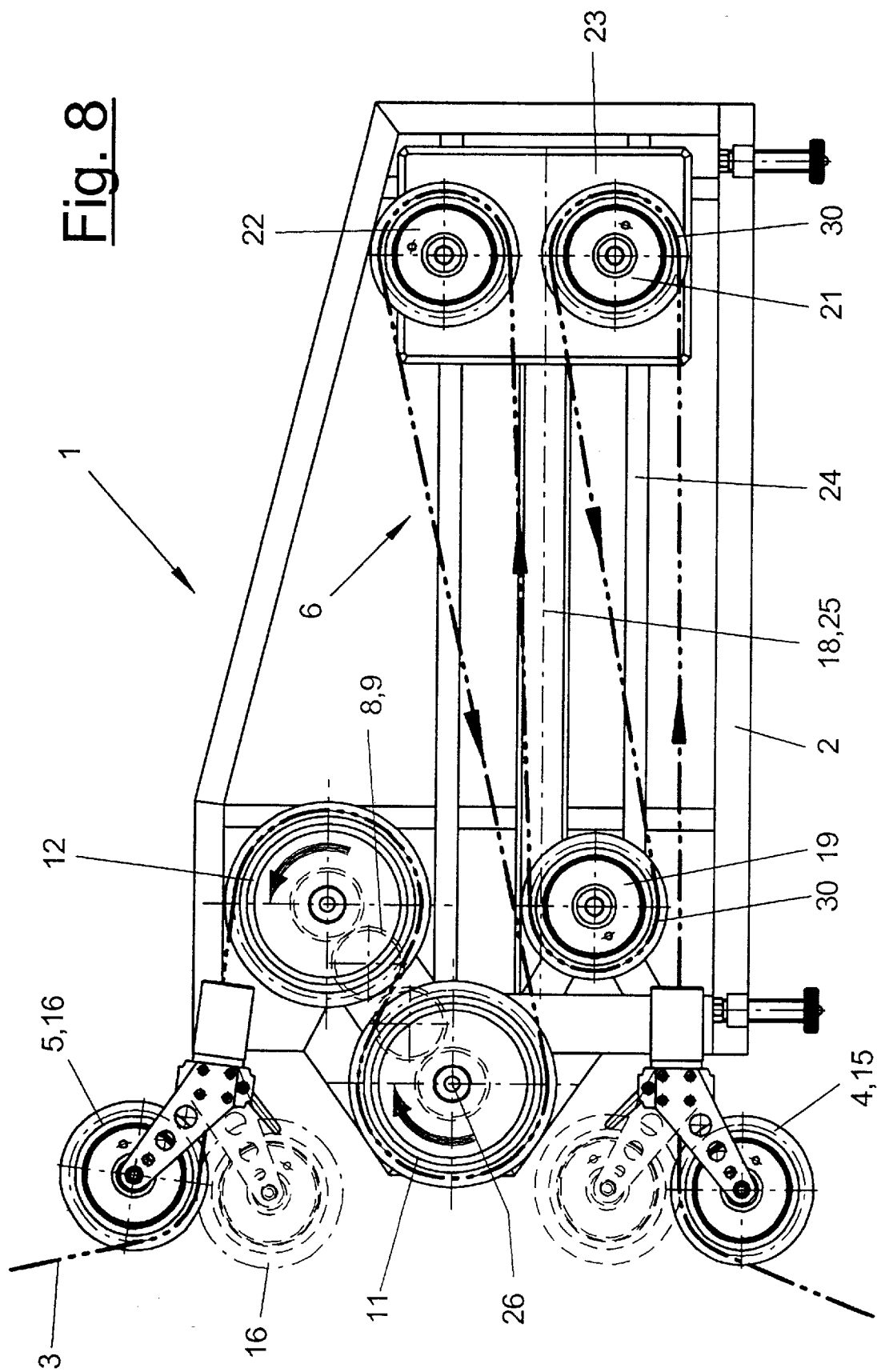
FIG. 8 is a side view of a variant of a cable saw.
Figure 9:
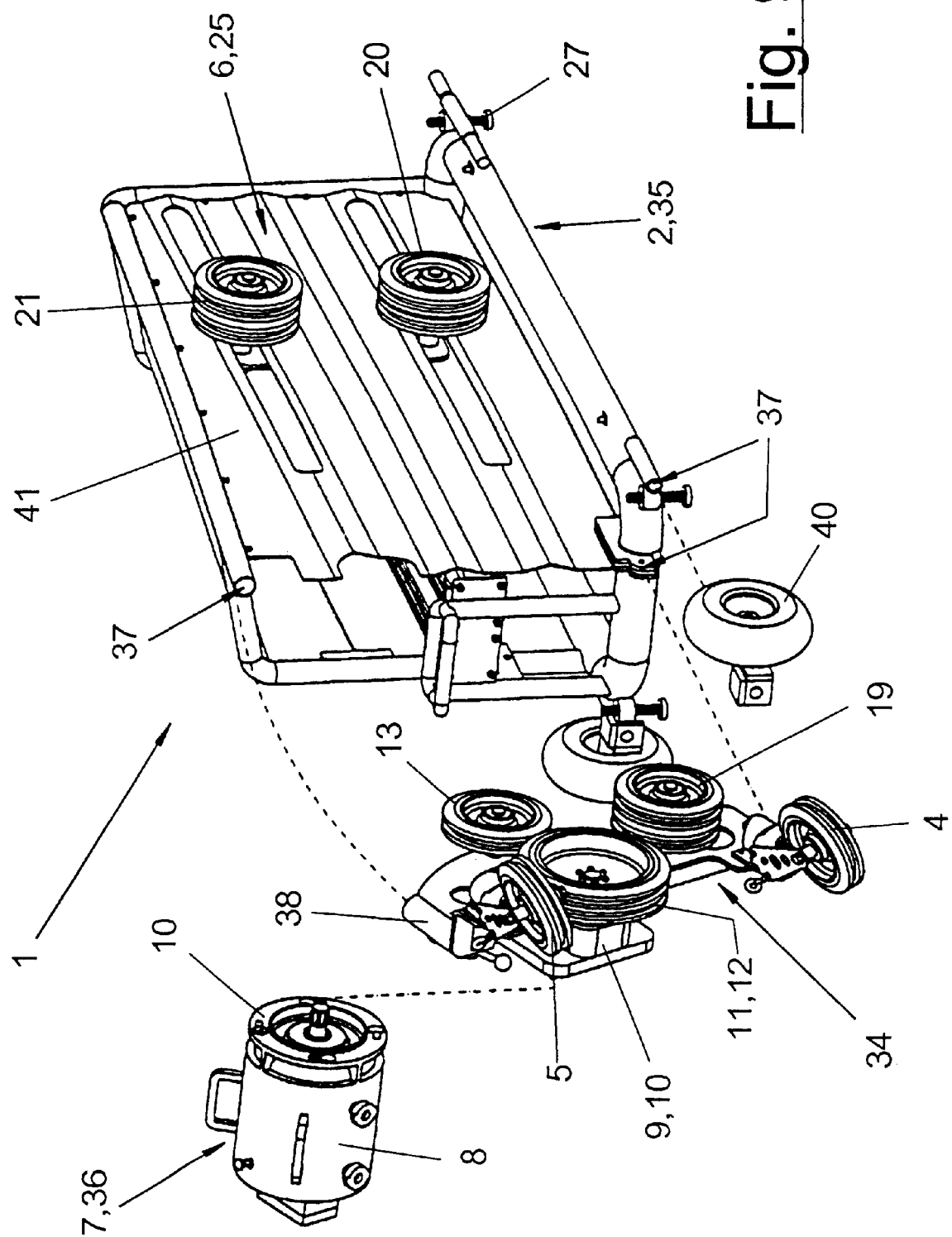
FIG. 9 is an exploded view of a variant of the cable saw.
Figure 10:
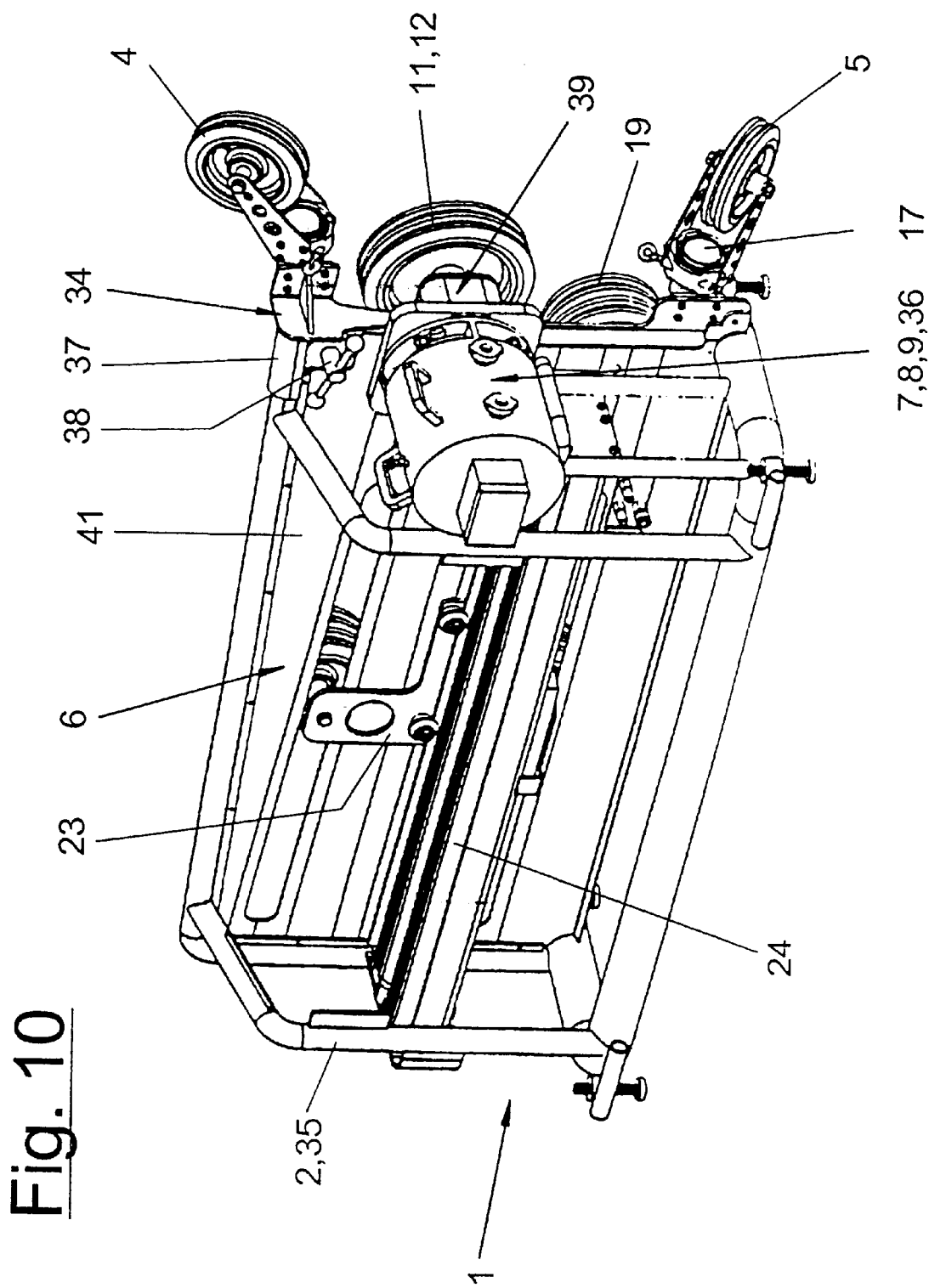
FIG. 10 is a perspective view of another variant of the cable saw according to FIG. 9 from behind.

Referring to the drawings in particular, FIGS. 1 through 3 show a side view, a top view and a front view, respectively, of a cable saw 1. FIG. 8 shows a side view of a variant of the cable saw 1. FIGS. 9 and 10 show other variants in an exploded view and in a perspective view.

Figure 13:
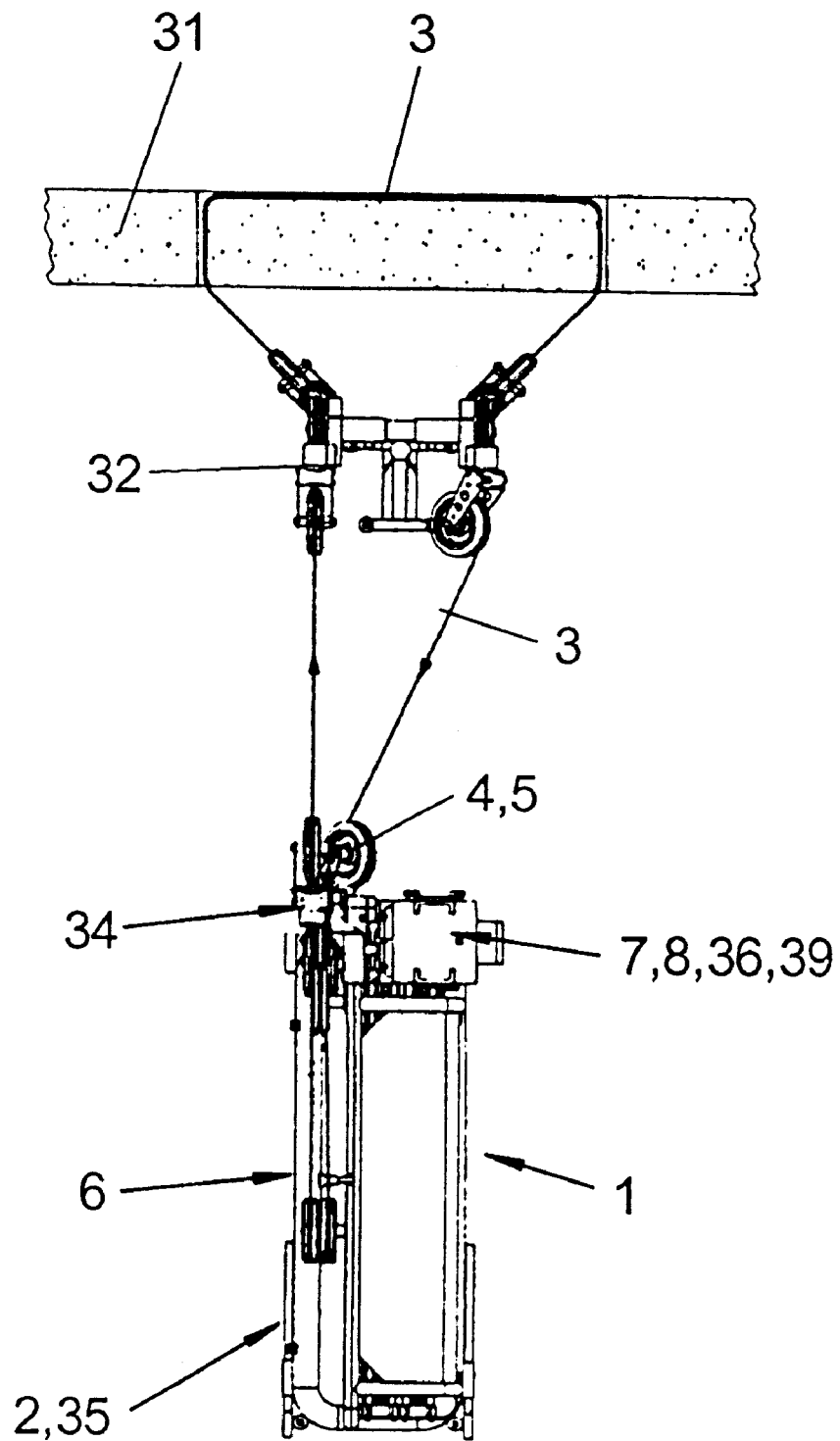
FIG. 13 is a top view showing an attachment position of the cable saw.

As is illustrated in FIGS. 11 through 13, the cable saw 1 is used to saw upright walls, horizontal floors or other workpieces 31 of any orientation consisting of stone, concrete, brickwork or the like, and it has an endless and circulatingly driven, flexible sawing cable 3 with suitable abrasive grinding or cutting elements on its circumference, e.g., diamond sections. The cable saw 1 is positioned at a spaced location from the workpiece 31 and drives the sawing cable 3 circulatingly. The sawing cable 3 exits from the cable saw 1 at a cable outlet 5, is guided in a suitable manner around the workpiece 31 and optionally around one or more cable deflecting means 32, 33 in front of and/or behind the workpiece 31 and returns into the cable saw 1 at a cable inlet 4. The circulatingly moved sawing cable 3 is pressed against the workpiece 31 in the process and cuts into the workpiece 31 due to the pressing pressure. FIGS. 11 and 12 show the progression of sawing on the example of an upright wall 31 in a side view. FIG. 13 shows a top view of the working position.

The cable saw 1 may be arranged at the workpiece in various working positions and may optionally have one or more of the above-mentioned additional external cable deflecting means 32, 33. Depending on the field of use, it may be designed as a wall saw, a circular cable saw, a plunging cable saw, a tilting pipe cutter or the like.

In the exemplary embodiments shown, the cable saw 1 has a frame 2, which accommodates a drive 7 and a movable and driven cable storage unit 6 for the sawing cable 3. The cable storage unit 6 accommodates an increasing amount of free cable length as the depth of cut increases and tensions the sawing cable 3. FIGS. 11 and 12 show this arrangement.

The drive 7 for the sawing cable 3 comprises a motor 8, which optionally drives two or more drive wheels 11, 12 with the interposition of a transmission 9 and a change-over coupling 10. The sawing cable 3 is wound around two drive wheels 11, 12 and is driven in a circulating manner.

In the exemplary embodiment according to FIG. 1, the drive wheels 11, 12 are arranged coaxially one on top of another and rotate in the same direction and at equal speed. In the embodiment according to FIG. 8, the two drive wheels 11, 12 are arranged with parallel roller axes 26 next to one another at spaced locations and essentially at the same level. They rotate at equal speed and in opposite directions.

In FIGS. 1 through 3, the drive wheels 11, 12 may be attached to a common axis 26 as individual wheels. As an alternative, the drive wheel may be a one-piece double wheel with two guide grooves. The roller and drive axis 26 extends essentially in parallel to the substrate and, in the normal, upright arrangement of the device, essentially horizontally.

The motor 8 may have any desired design. In the preferred exemplary embodiment, it is an electric motor, especially an a.c. motor or three-phase motor. This motor may be controlled and optionally regulated in a suitable manner by phase control or frequency control.

In the embodiments shown, a reducing gear 9, which may optionally also be eliminated if the motor is selected correspondingly, at least in the embodiment according to FIG. 1, is arranged between the motor 8 and the drive wheels 11, 12. This is preferably a toothed gearing. In a variant according to FIG. 8, a common gear 9 is provided for both drive wheels 11, 12 with a corresponding reversing stage for changing the direction of rotation. In addition, a suitable synchronizing unit may be present, which ensures the uniform speed despite the wheels rotating in opposite directions and compensates clearance and tolerances in the gear.

The drive 7 may have the above-mentioned change-over coupling 10, which makes possible the change-over of the motor 8 alone or together with the gear 9 depending on the arrangement. As an alternative, a double change-over coupling may be present, which is located between the motor 8 and the gear 9 as well as between the gear 9 and the drive wheels 11, 12. The change-over coupling 10 is preferably designed as a quick coupling, which is equipped, e.g., with a plug insert. The motor shaft may be designed, e.g., as a spline shaft and can be plugged into a corresponding mount at the gear 9 or at the drive wheels 11, 12. The power supply and the control may also be changed with the motor 8.

At least one compensating roller 13 is arranged adjacent to the drive wheels 11, 12 in the embodiment according to FIGS. 1 through 3. This compensating roller is preferably located in front of the drive wheels 11, 12 in the longitudinal direction 18 of the saw. The compensating roller 13 preferably has a roller axis 14 aligned in parallel to the drive roller axis 26 and a corresponding roller shape. As an alternative, the compensating roller 13 may also have an oblique roller axis 14 or an oblique bearing compare FIGS. 1 and 2. The oblique position is present, e.g., essentially in the vertical plane downward or upward. Due to the oblique position, the sawing cable 3 is guided from one drive wheel to the other 11, 12 without squeezing. The distance between the compensating roller 13 and the roller axis 26 of the drive wheels 11, 12 is adjustable. However, it remains constant during operation in order to leave the loop length equal.

The frame 2 is preferably designed as a mount-like frame and rests with four vertically adjustable frame feet 27 on the substrate. In addition, two or more removable transport wheels 40 with pin guide 37 may be present (compare FIG. 9). Special fixing on the substrate is unnecessary. The frame 2 is designed for the upright arrangement of the cable saw 1. The roller axes 26 extend in parallel to the substructure of the frame or to the substrate. As a result, the sawing cable 3 circulates essentially in a vertical plane. This arrangement is shown in FIGS. 4 through 7, which will be described in greater detail below.

The cable saw 1 has a cable inlet 4, which is preferably arranged at the bottom, and a cable outlet 5 arranged at the top on the frame 2. As an alternative, the arrangement may also be transposed. The cable inlet 4 and the cable outlet 5 comprise an inlet roller 15 and an outlet roller 16 each, which are mounted freely rotatably. The rollers 15, 16 are carried by a bent bearing arm, which is in turn mounted freely rotatably around a pivot axis 17 or a drag bearing on the frame 2. The drag bearing 17 can be locked with a suitable locking mechanism 28 in the selected pivoted position. FIGS. 1 and 8 show alternative positions by thin broken lines. The drag bearings 17 are designed as hollow axles, through which the sawing cable 3 is led. The hollow axles prevent the sawing cable 3 from whipping freely in case of a break.

One of the two pivot axes 17, preferably that of the cable inlet 4, preferably extends in parallel to the longitudinal axis 18 of the saw. The other pivot axis 17, preferably that of the cable outlet 5, extends, by contrast, obliquely in a vertical plane in relation to the longitudinal axis 18 of the saw. The cable outlet 5 is bent obliquely to the outside as a result. This oblique position is more favorable for the kinematics of the cable than the parallel arrangement of both pivot axes 17.

As is further illustrated especially by FIG. 3, the cable inlet 4 and the cable outlet 5 are arranged laterally offset in the horizontal direction in relation to one another. The cable inlet 4 is located closer to the vertical brace of the frame 2 than the cable outlet 5. Moreover, the cable inlet 4 is located in a common vertical plane with the inner drive wheel 12. The cable outlet 5 is located in a common vertical plane with the outer drive wheel 11.

The oblique arrangement of at least one of the two pivot axes 17 of the cable inlet 4 or the cable outlet 5 is also present in the variant according to FIG. 8. The lateral offset of the inlet and outlet rollers 15, 16 may also be present here. However, the rollers 15, 16 may also be located at the same level and preferably in the same vertical plane as the two drive wheels 11, 12.

In both exemplary embodiments, the cable storage unit 6 comprises at least one stationary deflecting roller 19 and a plurality of deflecting rollers 20, 21, 22 that can be moved to and fro in the direction of the horizontal longitudinal axis 18 of the saw. The latter deflecting rollers are preferably arranged on a yoke 23, which is mounted movably on a horizontal guide 24 and is moved forward and backward by a storage unit drive 25. The cover plate 41 shown in FIGS. 9 and 10, which is fastened in the frame 2 and has movement slots for the axles of the deflecting rollers 20, 21, 22, may be arranged between the yoke 23 with the guide 24 and the deflecting rollers 20, 21, 22. The cover plate 41 and the movement slots may have protective functions and optionally also guide functions for the deflecting rollers 20, 21, 22. A detachable protective cover not shown), which covers the entire lateral surface of the frame 2 together with the sawing cable guide and leaves open only the cable inlet 4 and the cable outlet 5, may also be arranged on the outside above the drive wheels 11, 12 and the deflecting rollers 19, 20, 21, 22.

The storage unit drive 25 may have any desired design. In the preferred exemplary embodiment, it is a pneumatic cylinder without a piston rod. The cable storage unit 6 takes up the free cable length, which increases corresponding to the depth of cut, and buffers same. As a result, the sawing cable 3 does not need to be shortened despite the increasing depth of cut. The storage unit drive 25 keeps under tension the sawing cable 3 laid in a plurality of loops between the movable deflecting rollers 20, 21, 22 and the stationary deflecting roller or rollers 19 and the drive wheels 11, 12 and buffers possible vibrations.

A stationary roller arrangement 19 is arranged close to the cable inlet 4 in the embodiments shown. It comprises a one-piece double roller with two guide grooves 29, 30 arranged one on top of another in the axial direction. The inner guide groove 30 is located closer to the frame 2 than the outer guide groove 29. As an alternative, two individual wheels may also be present, which are rigidly connected to one another, like the guide grooves 29, 30, or are separate and freely rotatable.

The deflecting roller 19 is arranged between the cable inlet 4 and the drive wheels 11, 12. According to FIG. 3, its inner groove 30 is located in the same vertical plane as the guide groove of the inlet roller 15 and the inner drive wheel 12. The outer guide groove 29 of the deflecting roller 19 is located, by contrast, in the same vertical plane as the guide groove of the outlet roller 16 and the outer drive wheel 11. No stationary deflecting roller arrangement is present at the cable outlet 5 in the preferred embodiment. This may also be different in a variant, which is not shown.

In the exemplary embodiment shown in FIGS. 1 through 3, the yoke 23 extending at right angles to the guide 24 carries two deflecting roller arrangements 20, 21, which are arranged next to one another at spaced locations at right angles to the longitudinal axis 18 of the saw and are designed as double rollers with two guide grooves 29, 30 each. The design and the groove arrangement are the same as in the case of the stationary deflecting roller 19.

Especially the outer guide groove 29 of the deflecting roller is aligned with the outlet roller 16 and the outer drive wheel 11. Otherwise, the inner and outer guide grooves 29, 30 of the deflecting rollers 19, 20, 21 are in the same vertical plane and cable plane.

In the design variant according to FIG. 8, a single deflecting roller 22 may be present instead of the upper double roller 21. The roller axes 26 of all deflecting rollers 19, 20, 21, 22 extend in parallel to one another and to the axis of the drive wheels 11, 12.

The total number of the individual guide grooves 29, 30 of the movable deflecting rollers 20, 21, 22 is smaller than or equal to the total number of drive wheels 11, 12 and optionally of the compensating roller 13 as well as the guide grooves 29, 30 of the stationary deflecting rollers 19 in both embodiments. Two movable deflecting rollers 20, 21 and four movable guide grooves 29,30, which cooperate with four stationary wheels 11, 12, 13, 19 with five guide grooves 29, 30, are present in FIGS. 1 through 3. In FIG. 8, there are four guide grooves 29, 30 of the stationary rollers or wheels 11, 12, 19 for the three guide grooves 29, 30 of the movable deflecting rollers 21, 22.

FIGS. 4 through 7 illustrate various possibilities of arranging the sawing cable 3 on a cable saw 1 from FIGS. 1 through 3. The different cable strands or cable sections can cross one another because of the different height of the grooves. To better illustrate the guiding of the cable, the guide grooves 29, 30 of the double rollers 19, 20, 21 are shown with different diameters. The larger diameter represents the guide groove 30 located inside in relation to the frame 2 and the smaller diameter represents the outer guide groove 29.

Figure 4:
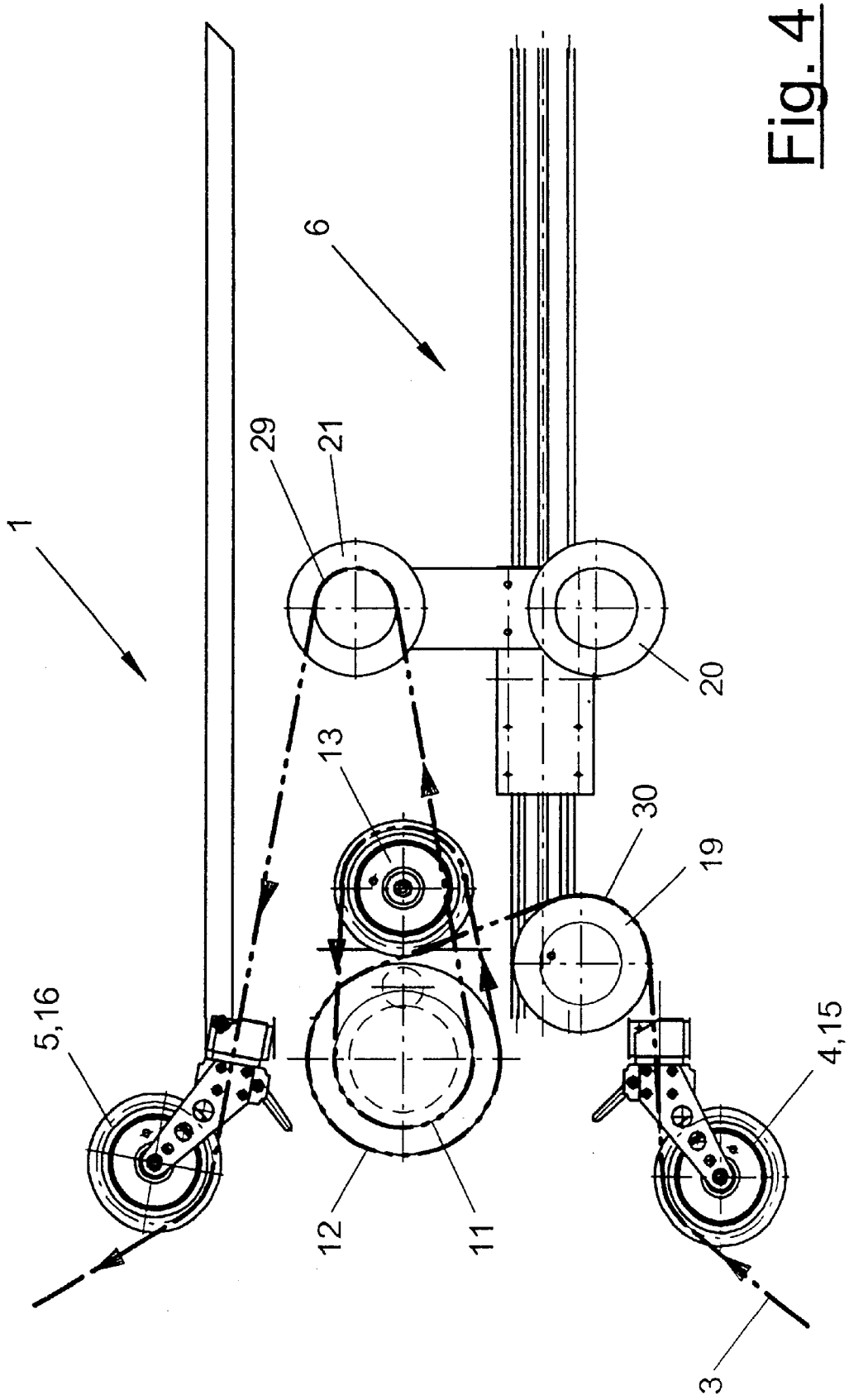
FIG. 4 is a view showing one of different possibilities of arranging the cable for the cable saw according to FIGS. 1 through 3.

In the first variant according to FIG. 4, the sawing cable 3 is first led to the cable inlet 4 onto the inner guide groove 30 of the stationary double roller 19 and from there onto the inner drive wheel 12. The sawing cable 3 then runs to the outer drive wheel 11 via the oblique compensating roller 13 and goes from here to the cable outlet 5 via the outer guide groove 29 of the deflecting roller 21. The deflecting roller 20 does not guide the cable here. The cable storage unit 6 contains two cable strands in this embodiment due to the simple deflection at the roller 21.

Figure 5:
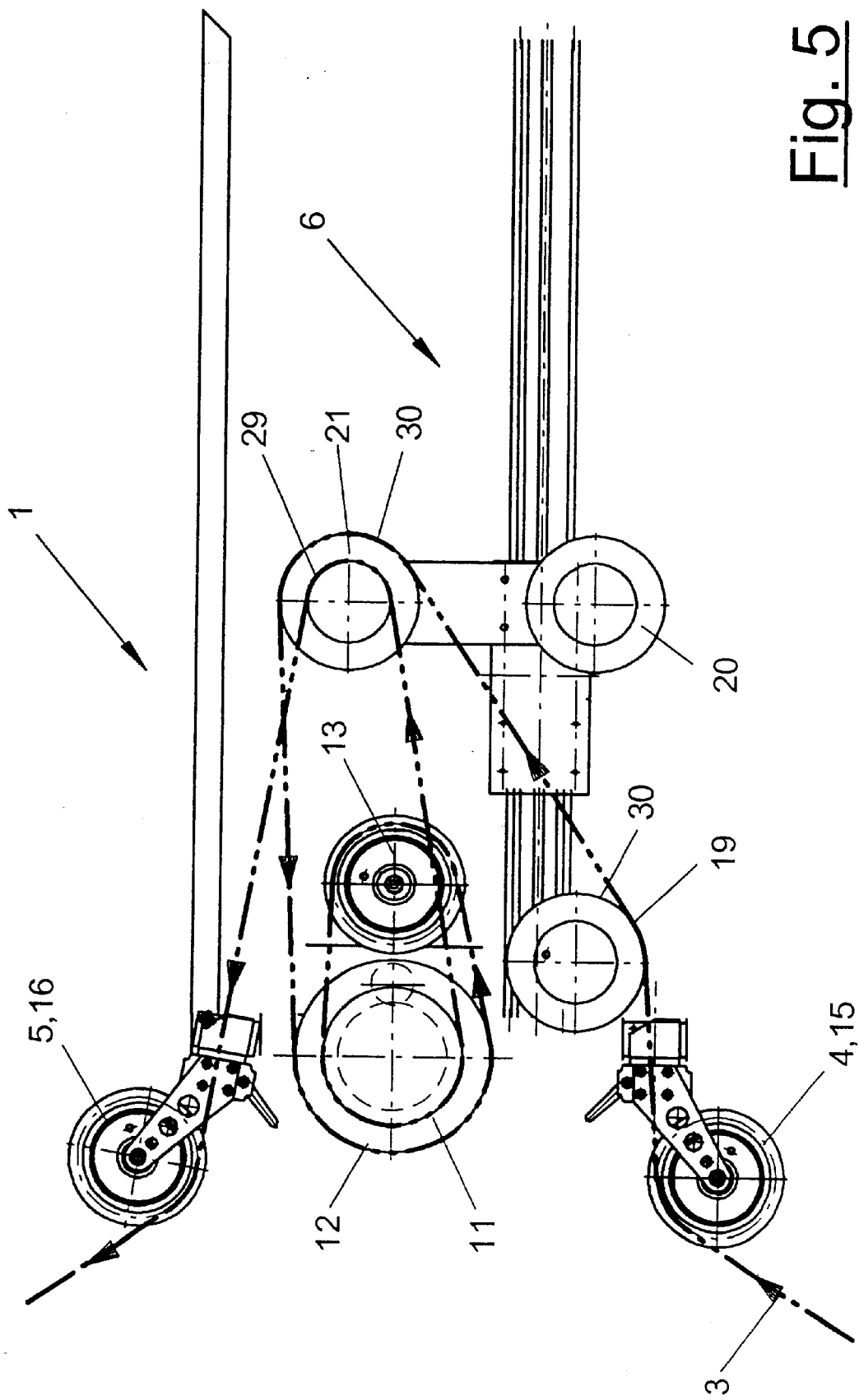
FIG. 5 is a view showing one of different possibilities of arranging the cable for the cable saw according to FIGS. 1 through 3.

In the variant according to FIG. 5, the cable storage unit 6 has four cable strands. Unlike in FIG. 4, the sawing cable 3 is led here from the inner guide groove 30 of the stationary deflecting roller 19 to the inner guide groove 30 of the movable deflecting roller 21 and from here farther to the inner drive wheel 12. After running over the compensating roller and the outer drive wheel 11, the sawing cable 3 runs to the outer guide groove 29 of the deflecting roller 21 and from here the cable outlet 5.

Figure 6:
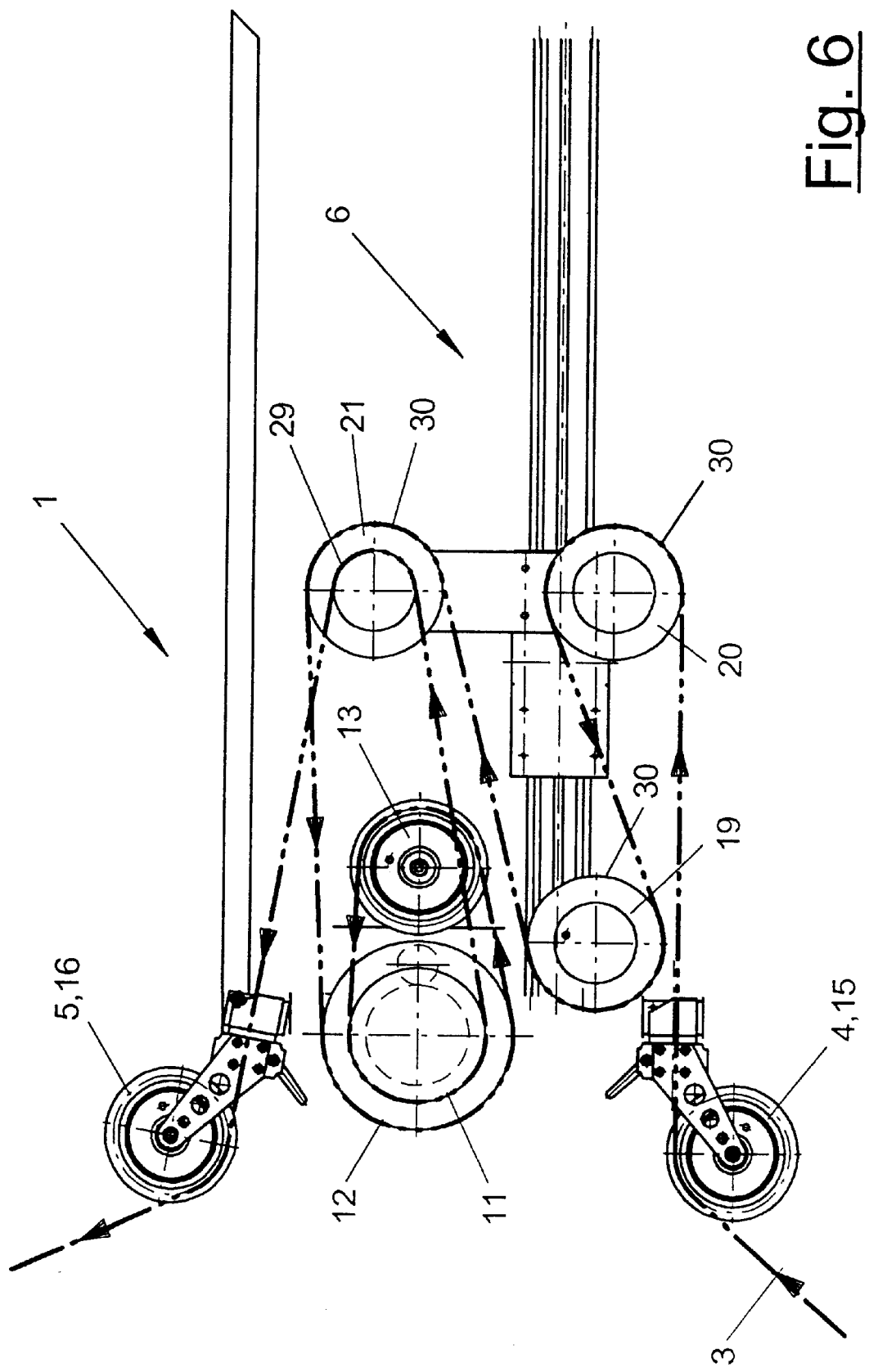
FIG. 6 is a view showing one of different possibilities of arranging the cable for the cable saw according to FIGS. 1 through 3.

FIG. 6 shows another variant with six cable strands with the involvement of the deflecting roller 20. The arriving sawing cable 3 is first led over the inner guide groove 30 of the movable deflecting roller 20 to the inner guide groove 30 of the stationary deflecting roller 19 and from here to the inner guide groove 30 of the second movable deflecting roller 21. From this, the sawing cable 3 runs to the outer groove 29 of the movable deflecting roller 21 and from here to the cable outlet 5 over the inner drive wheel 12, the compensating roller 13 and the outer drive wheel 11 analogously to FIG. 5.

Figure 7:
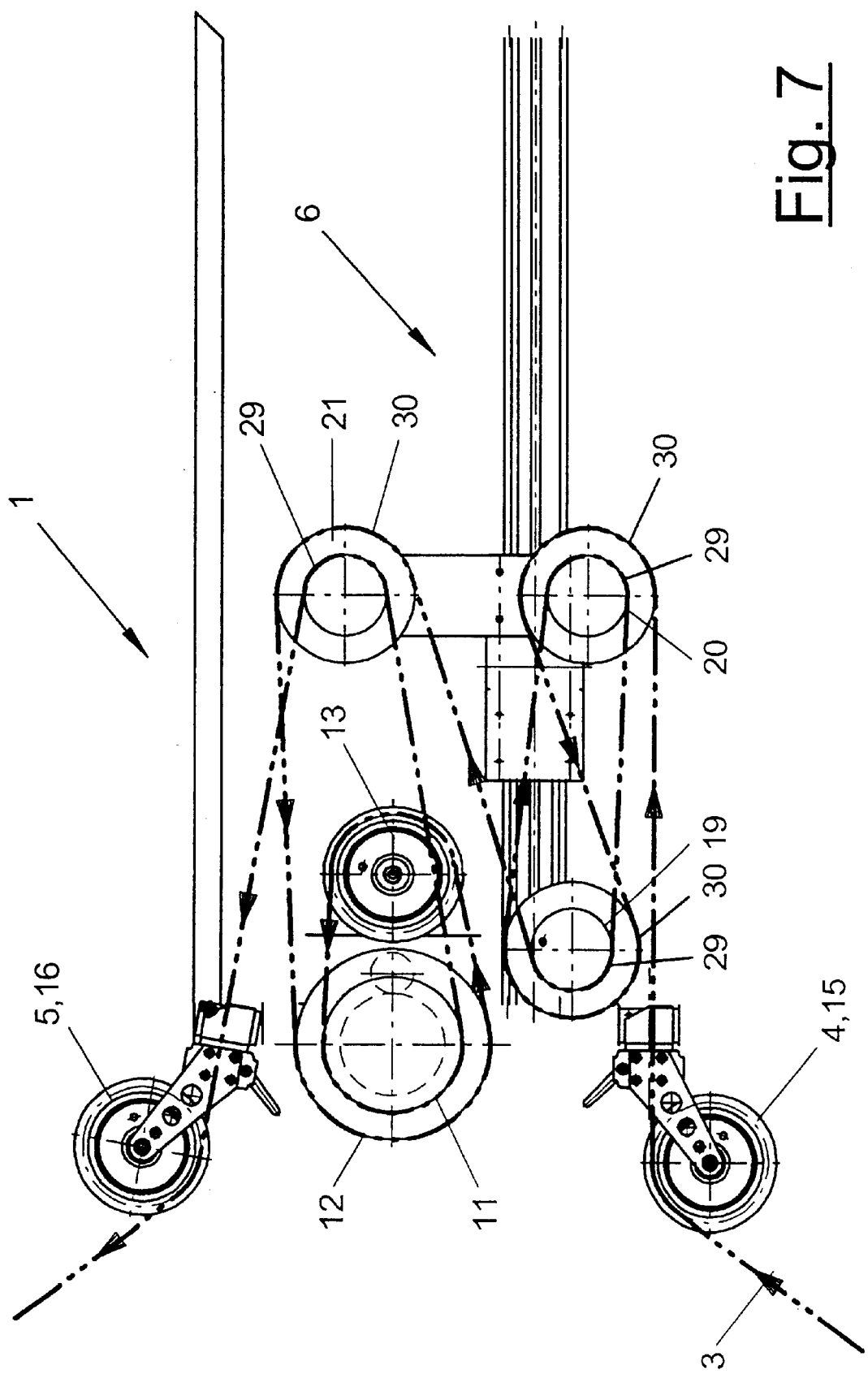
FIG. 7 is a view showing one of different possibilities of arranging the cable for the cable saw according to FIGS. 1 through 3.

The variant according to FIG. 7 has the maximum storage capacity with eight cable strands. The guiding of the cable from the cable inlet 4 to the inner guide groove 30 of the stationary deflecting roller 19 is the same as in FIG. 6. Unlike in FIG. 6, the sawing cable 3 is then returned from the inner guide groove 30 of the stationary deflecting roller 19 first to the outer guide groove 29 of the movable deflecting roller 20 and it runs from here to the inner guide groove 30 of the movable deflecting roller 21 over the outer guide groove 29 of the stationary deflecting roller 19. From here on, the guiding of the cable is again the same as in FIG. 6.

FIG. 8 also shows a possible variant of guiding the cable. The sawing cable 3 is led from the cable inlet 4 in a common vertical plane first over the movable deflecting roller 21 to the stationary deflecting roller 19 and from here farther over the second movable deflecting roller 22 to the two drive wheels 11, 12, from which the sawing cable 3 runs directly to the cable outlet 5. The two deflecting rollers 19, 21 are designed as double rollers, so that the sawing cable can still be led over the two rollers 19, 21 in an additional loop before the deflecting roller 22 in a variant which is not shown.

FIGS. 9 and 10 show two more design variants of the cable saw 1, which can be taken apart into a plurality of basic components in these exemplary embodiments. One basic component is formed by a main roller head 34, which is fastened to the frame 2 by means of a pin guide 37 and a suitable fastening 38, e.g., an eccentric screw. The main roller head comprises a carrier frame, on which at least the stationary deflecting roller 19 and the cable inlet 4 as well as the cable outlet 5 with the corresponding rollers 15, 16 are arranged. In the embodiment shown in FIG. 9, the main roller head 34 also carries the gear 9 and the drive wheels 11, 12 as well as the compensating roller 13, which may be optionally present.

The second basic component is formed by the motor unit 3 6, which comprises the motor 8 and the change-over coupling 10 in this exemplary embodiment. The third basic component is formed by a frame unit 35, which comprises the cable storage unit 6 with the storage unit drive 25 and the movable deflecting rollers 20, 21 or, as an alternative, also the deflecting roller 22. In this breakdown into components, the main roller head 34 and the motor unit 36 have about the same weight and together have approximately the same weight as the frame unit 35.

In a variant of FIG. 9, which is not shown, it is possible to associate the gear 9 with the motor unit 10 and to flange it directly on the motor 8. The change-over coupling 10 is now between the gear 9 and the drive wheels 11, 12 at the main roller head 34.

FIG. 10 shows a perspective view of the cable saw 1 from the rear side. The drive wheels 11, 12 are associated with the motor unit 36 in this embodiment. In this case, the motor 8 forms a so-called drive unit 39 with the gear 9 and the drive wheels 11, 12, and this drive unit can be detachably connected to the main roller head 34. A change-over coupling 10 may again be optionally present between the motor 8 and the gear 9 and/or between the gear 9 and the drive wheels 11, 12, so that the drive unit 39 can be taken apart even more. The main roller head 34 comprises only the deflecting roller 19, the cable inlet 4, the cable outlet 5 and optionally the compensating roller 13 in the variant of FIG. 10.

In the attached position, the main roller head 34 complements the frame 2 on the front side of the saw and forms the front closure of the frame. The connection is self-securing due to the pin guides 37 and the pull of the sawing cable 3 and of the storage unit drive 25. The eccentric screw 38 now needs to take up only the clearance from the pin guide 37.

The removable motor 8 or the motor unit 36 may also be used in connection with other tool machines not shown and replaced between the different machines. These are preferably other types of tool machines for processing stones, concrete and similar materials. The cable saw 1 with the frame unit 35 and optionally the main roller head 34 is designed as a driveless skeleton machine in this case. The other tool machines may also be designed as skeleton machines in a similar manner. A motor 8 or a motor unit 36, which are attached to operate the skeleton machines when needed, is now sufficient for these skeleton machines. To make it possible to combine the motor 8 or the motor unit 36 with the different skeleton machines and their different kinematics and drive requirements, the motor 8 has a correspondingly broadly dimensioned control or regulation, which makes possible an optimal adaptation to the necessary torque or speed curves.

Various modifications of the embodiments shown are possible. On the one hand, the design embodiment of the drive 7 can be varied within the framework of the present invention as desired. Furthermore, the cable storage unit 6 may also have different designs, and the number and the arrangement of the stationary and movable deflecting rollers may vary. Moreover, the number and the arrangement of the drive wheels 11, 12 may differ from the exemplary embodiments shown. In addition, the design and the set-up of the frame 2 are variable as well. As an alternative, it may be arranged horizontally or on edge. In the case of a horizontal arrangement, the plane in which the cable runs is essentially horizontal. However, the essentially vertical plane in which the cable runs in the exemplary embodiments has kinematic advantages.

While specific embodiments of the invention have been shown and described in detail to illustrate the application of the principles of the invention, it will be understood that the invention may be embodied otherwise without departing from such principles.

What is claimed is:

1. A cable saw, comprising:
   a frame;
   a motor drive with a plurality of said adjacent drive wheels;
   a cable storage unit;
   at least one stationary deflecting roller connected to said storage unit;
   a plurality of movable deflecting rollers connected to said storage unit;
   an endless sawing cable guided by to said stationary deflecting roller and guided by said plurality of movable deflecting rollers and driven in a circulating manner, said sawing cable being wound around said plurality of adjacent drive wheels with said adjacent drive wheels being driven together by said motor.

2. A cable saw in accordance with claim 1, wherein said drive wheels are arranged with a common stationary axle one on top of another and are driven in a same direction.

3. A cable saw in accordance with claim 2, further comprising: a compensating roller arranged adjacent to said drive wheels.

4. A cable saw in accordance with claim 1, wherein said drive has a change-over coupling.

5. A cable saw in accordance with claim 4, further comprising: a gear arranged in front of said drive wheels, said change-over coupling being arranged between said motor and said gear.

6. A cable saw in accordance with claim 1, wherein said stationary deflecting roller and said plurality of movable deflecting rollers are freely rotatable double rollers arranged coaxially one on top of another with a plurality of guide grooves.

7. A cable saw in accordance with claim 6, further comprising: a compensating roller arranged adjacent to said drive wheels, a number of guide grooves of said movable deflecting rollers is smaller than or equal to the total number of drive wheels and a number of guide grooves of said stationary deflecting roller and said compensating roller.

8. A cable saw in accordance with claim 1, wherein said cable storage unit has a storage unit drive with a pneumatic cylinder without piston rod.

9. A cable saw in accordance with claim 1, wherein the cable saw has a cable inlet and a cable outlet equipped with pivotable rollers, wherein at least one of said cable inlet and said cable outlet has an oblique pivot axis.

10. A cable saw in accordance with claim 9, wherein said inlet and outlet rollers are arranged offset in relation to one another in a direction of a roller axle.

11. A cable saw in accordance with claim 9, further comprising: a main roller head which is detachable from said frame, said stationary deflecting roller, said inlet and outlet rollers and said drive wheels being arranged on said main roller head.

12. A cable saw in accordance with claim 1, wherein said drive and said drive wheels are connected to form a drive unit, said drive unit being detachably connected to said frame or said main roller head.

* * * * *